No. 781,729. PATENTED FEB. 7, 1905.
G. M. KITZMILLER.
ESCAPEMENT MECHANISM FOR TYPE WRITING MACHINES.
APPLICATION FILED MAR. 30, 1904.
6 SHEETS—SHEET 2.
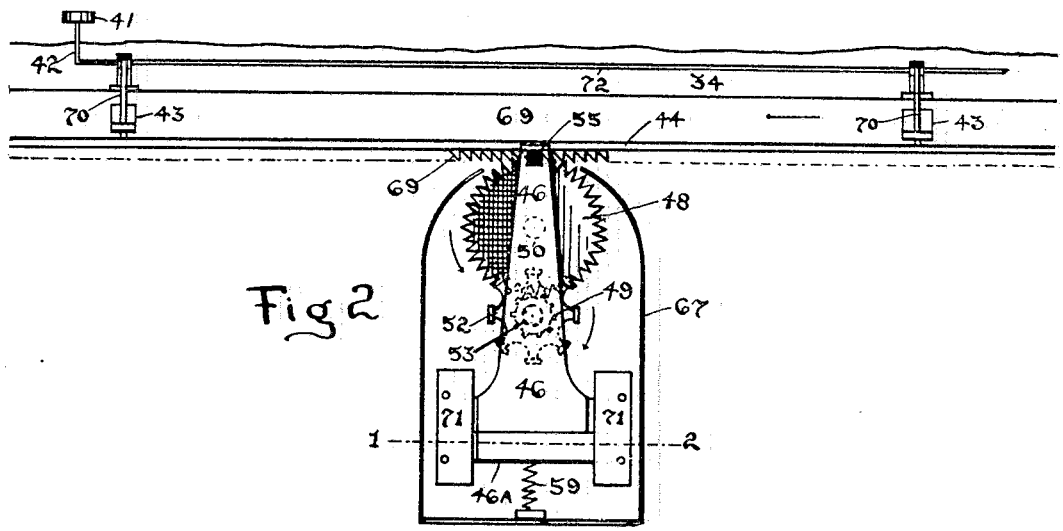
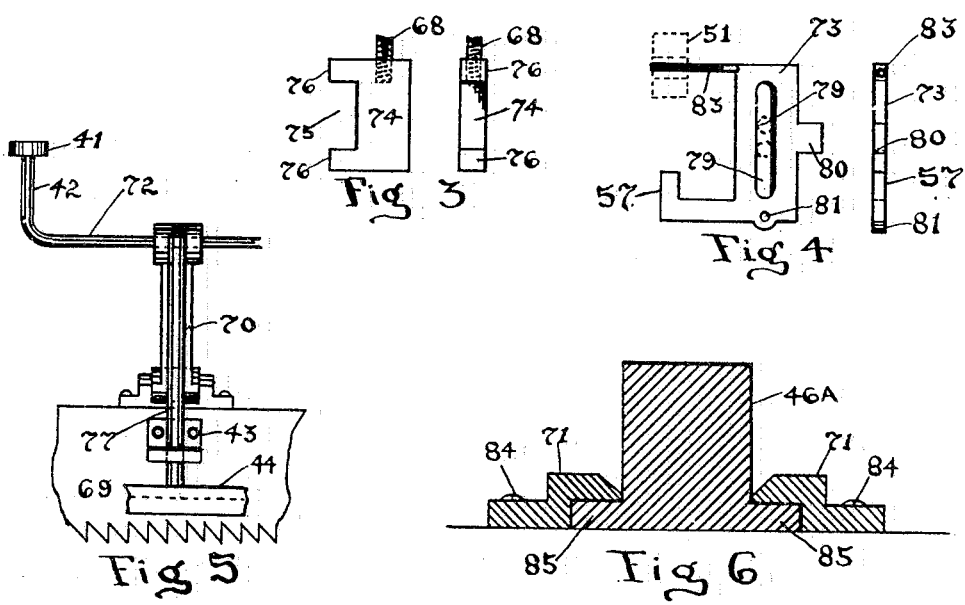

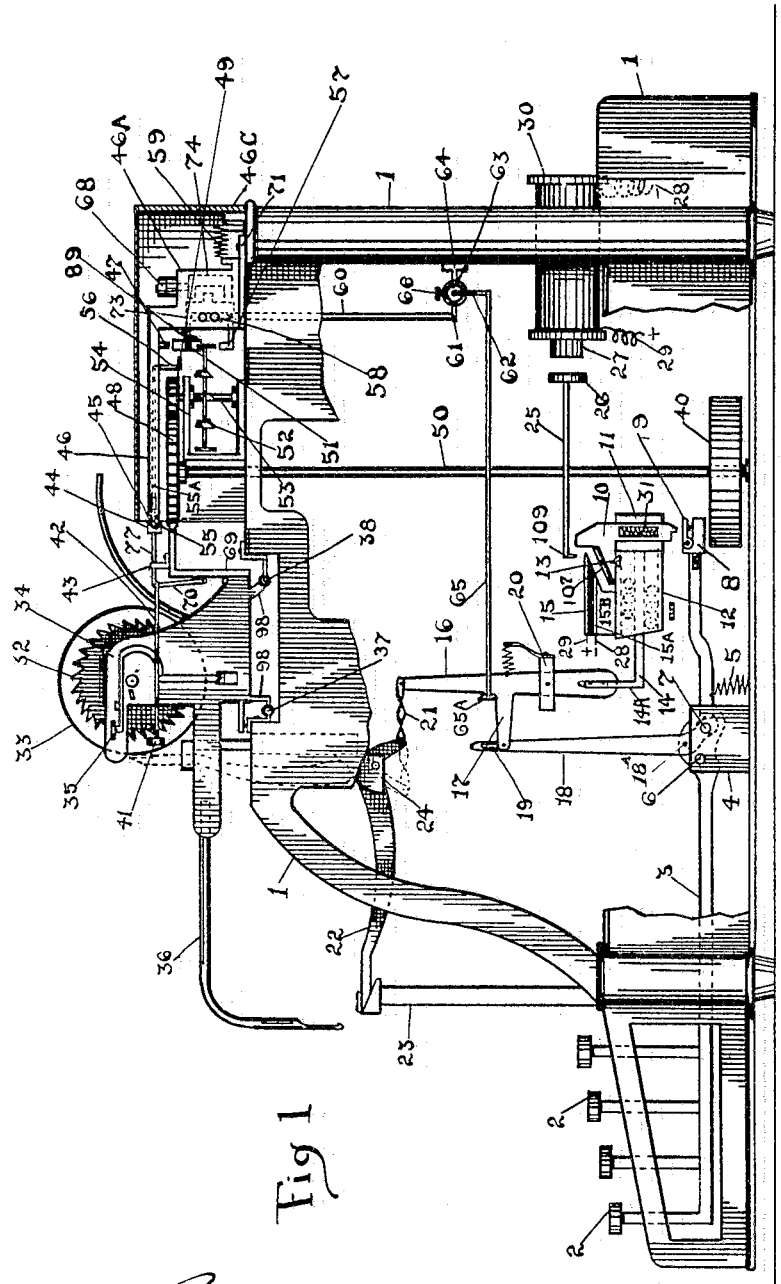

No. 781,729. PATENTED FEB. 7, 1905.
G. M. KITZMILLER.
ESCAPEMENT MECHANISM FOR TYPE WRITING MACHINES.
APPLICATION FILED MAR. 30, 1904.
6 SHEETS—SHEET 3.
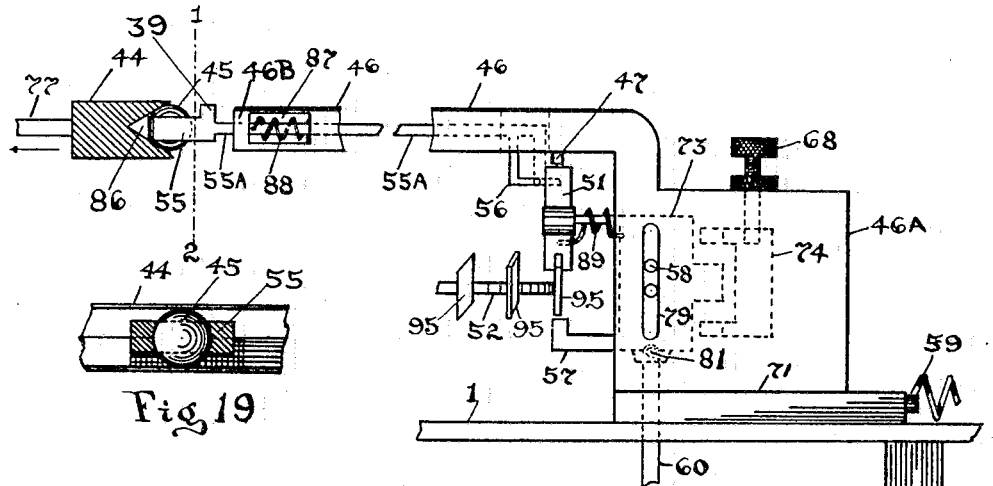
Fig. 19
Fig. 7
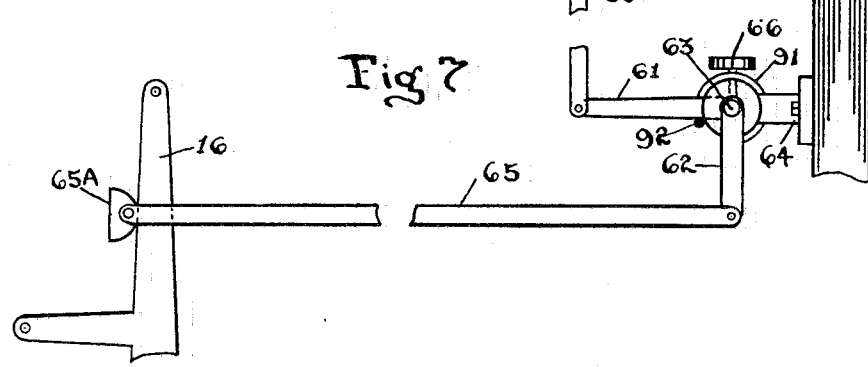
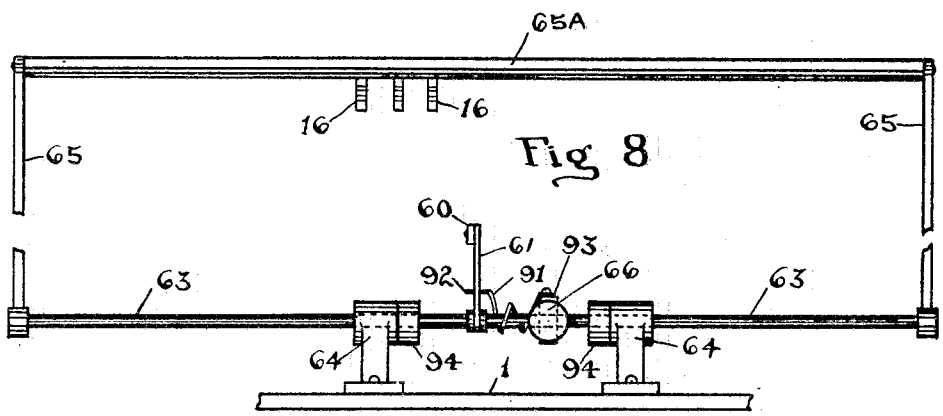
Fig. 8

No. 781,729. PATENTED FEB. 7, 1905.
G. M. KITZMILLER.
ESCAPEMENT MECHANISM FOR TYPE WRITING MACHINES.
APPLICATION FILED MAR. 30, 1904.
6 SHEETS—SHEET 4.
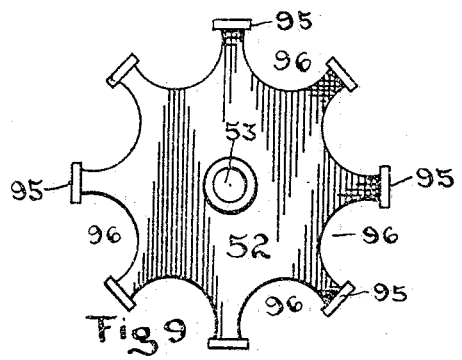
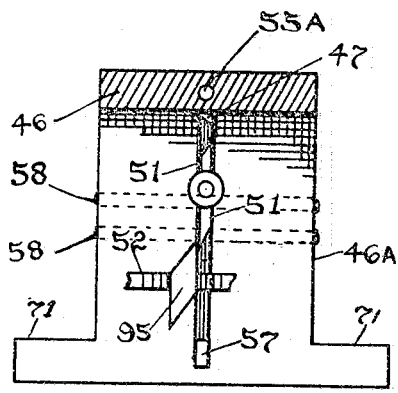
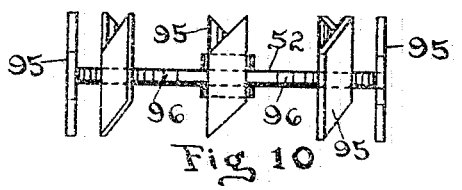
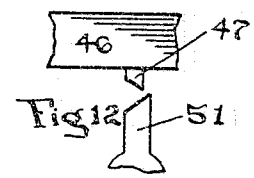
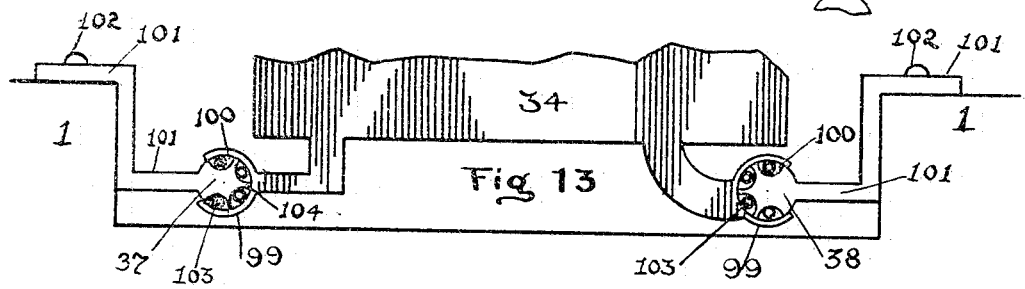
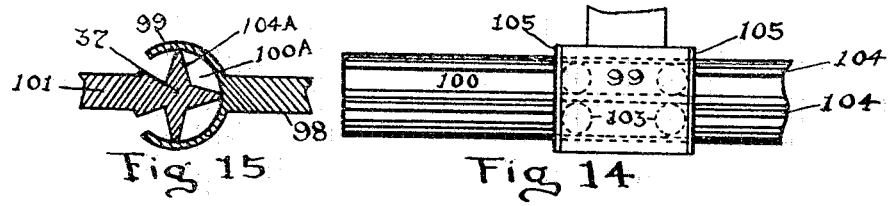

No. 781,729. PATENTED FEB. 7, 1905.
G. M. KITZMILLER.
ESCAPEMENT MECHANISM FOR TYPE WRITING MACHINES.
APPLICATION FILED MAR. 30, 1904.
6 SHEETS—SHEET 5.
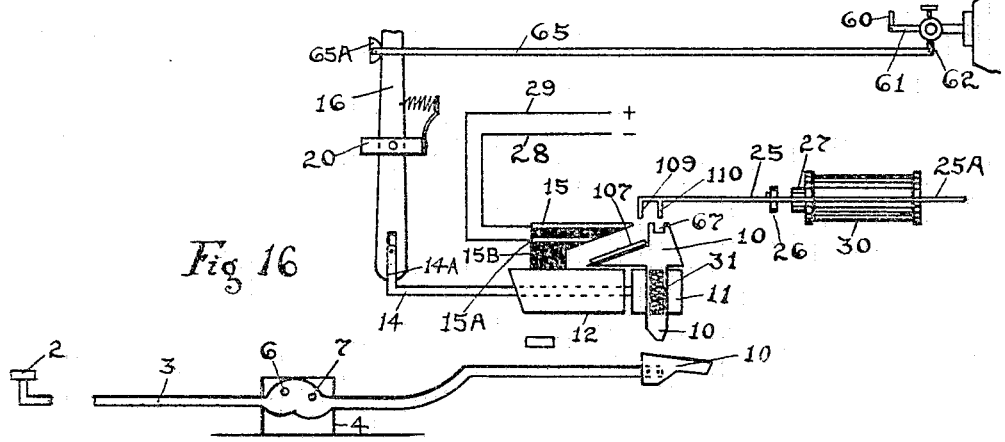
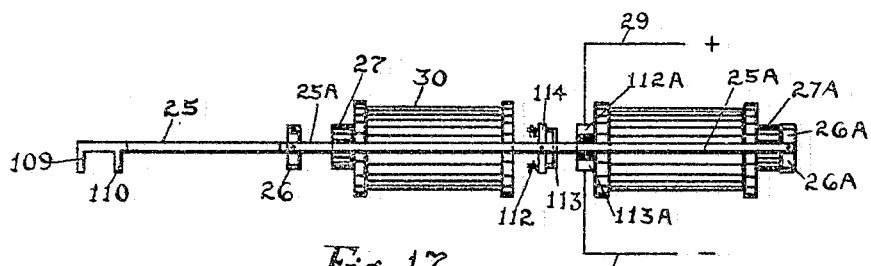
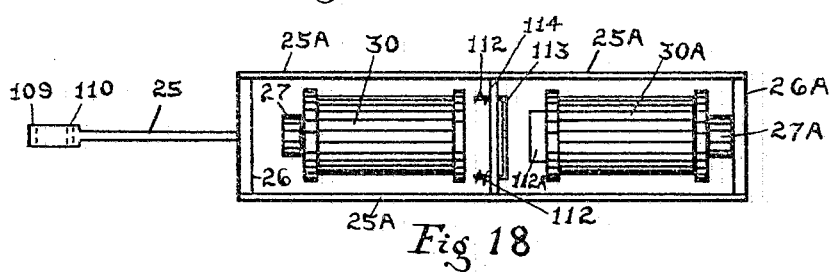

No. 781,729. PATENTED FEB. 7, 1905.
G. M. KITZMILLER.
ESCAPEMENT MECHANISM FOR TYPE WRITING MACHINES.
APPLICATION FILED MAR. 30, 1904.
6 SHEETS—SHEET 6.
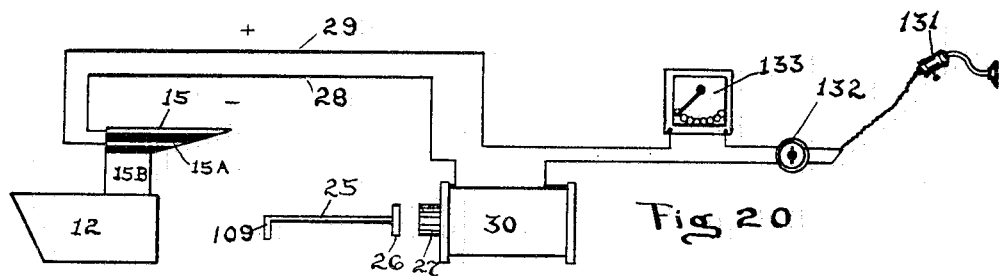
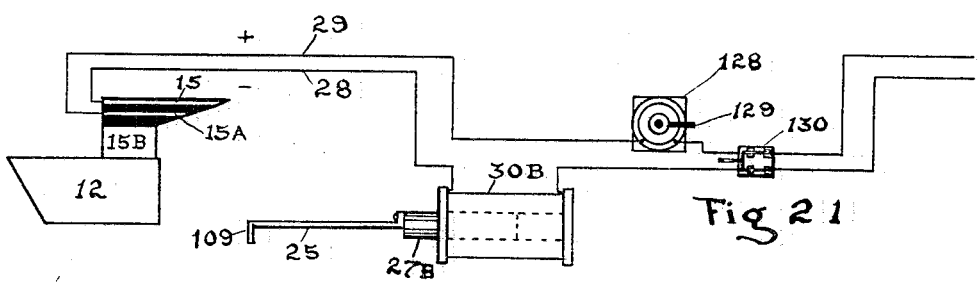
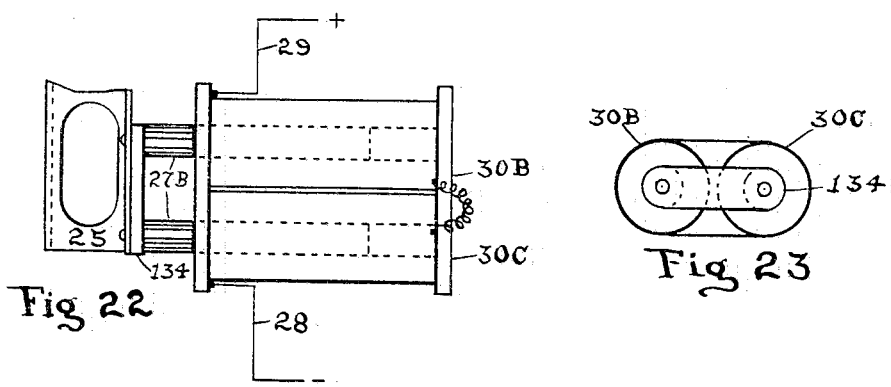

No. 781,729. Patented February 7, 1905.

UNITED STATES PATENT OFFICE.

GEORGE M. KITZMILLER, OF NORFOLK, VIRGINIA, ASSIGNOR TO THE ELECTRIC TYPEWRITER COMPANY OF NORFOLK, INCORPORATED, OF NORFOLK, VIRGINIA.

ESCAPEMENT MECHANISM FOR TYPE-WRITING MACHINES.

SPECIFICATION forming part of Letters Patent No. 781,729, dated February 7, 1905.

Application filed March 30, 1904. Serial No. 200,672.

*To all whom it may concern:*

Be it known that I, GEORGE M. KITZMILLER, a citizen of the United States, residing at Norfolk, in the county of Norfolk and State of Virginia, have invented new and useful Improvements in Escapement Mechanism for Type-Writing Machines, of which the following is a specification.

My invention relates to escapement mechanism for type-writing machines by which a lateral step-by-step motion is produced by means of suitable wheels, ratchets, and pawls or detents, &c., when the key-levers or space-bar is operated.

My invention also has for its object to provide a rapid step-by-step lateral motion to the carriage through the escapement mechanism by simply holding a certain key-lever down without a rapid motion of the operator's hand, as is the usual custom when it is desired to bring the carriage to a certain point on the writing-line for printing.

The results above referred to in my invention are accomplished by automatically making and breaking the electric circuit, as will be more fully explained hereinafter.

The main operating mechanism of my machine is fully set forth in my application Serial No. 190,376 for convertible electric typewriting machines, with which my present invention may be utilized, although I am not confined to that construction, as I may modify the same to apply it to another construction and still be within the subject-matter claimed herein.

Referring to the drawings, Figure 1 is an elevation of my improvement, one side of the framework being removed, so that the internal mechanism, which is shown in normal position, can be seen and understood, it being also understood that in this view only one set of levers and their connections are shown. Fig. 2 is a plan of the escapement mechanism. Fig. 3 is a side and end elevation, respectively, of the adjusting-block removed from the sliding yoke-block. Fig. 4 is a side and end elevation of the slotted detent-yoke, also removed from the yoke-block. Fig. 5 is a part plan of the carriage-rack, the grooved or V-shaped rod or track, and its operating-links and handle. Fig. 6 is a section through the line 1 2 in Fig. 2 of the sliding yoke-block and its guides. Fig. 7 is an enlarged part elevation of the escapement mechanism shown in Fig. 1, together with the universal bar and its operating parts. Fig. 8 is a plan of the universal bar, rods, and cranks for operating the escapement mechanism. Fig. 9 is a plan of the rhomboidal toothed wheel on an enlarged scale. Fig. 10 is an elevation of the same, showing the form of teeth. Fig. 11 is a front view, partly in section, of the movable or sliding arm and yoke-block, the arm of which extends over the escapement-wheel and the gears, more plainly shown in Fig. 7. Fig. 12 is an enlarged front elevation of a part of the arm, showing the fixed bevel-faced dog or lug and the oppositely-disposed bevel-face on the upper portion of the detent. Fig. 13 is a part end elevation of the carriage and tracks. Fig. 14 is an enlarged front elevation of the track and cylindrical sleeve. Fig. 15 is a cross-section of a modified form of the track. Fig. 16 is an elevation of the operating parts of the automatic spacing mechanism. Fig. 17 is a side elevation, and Fig. 18 is a plan, of magnets placed in tandem for operating the hooked channel-plate and the escapement mechanism by electric means. Fig. 19 is a cross-section on the line 1 2 in Fig. 7, showing the receptacle for the ball which rolls in the V-shaped rod or track. Fig. 20 is an elevation of the plunger-bar guide and terminal contact-plates and a magnet similar to that indicated in Fig. 1, showing electrical connections for direct current. Fig. 21 is a similar view to that shown in Fig. 1, in which a solenoid is used when the mechanism is to be operated by the alternating current. Fig. 22 is a plan of the solenoids and cores connected to the hooked channel-plate. Fig. 23 is an end view of the same.

In the drawings like reference-numerals indicate corresponding parts in all the views.

In Fig. 1, 1 is the frame of the machine, which may be of any suitable construction, 2 represents the key-lever keys, suitably lettered and numbered in the customary manner. 3 is a key-lever suitably mounted in a supporting-bar 4, extending transversely or across the machine. The key-lever is held in its normal position by the spring 5. The key-lever 3 is provided with an aperture 6 for the insertion of a rod or pin, which forms a common fulcrum for all the key-levers when the machine is to be electrically operated, in which case the vertical arms or levers 18, which have a permanent pivotal connection with the key-levers, as at 18$^A$, perform no function in the operation of the machine. It will be understood that the special repeating spacer mechanism hereinafter described is only operative electrically. The key-lever 3, Fig. 16, is provided with apertures 6 and 7, conforming to those of the other key-levers for convenience. When desired to convert the machine from electric to non-electric operation, the fulcrum-rod is removed from the aperture 6 and is inserted in the aperture 7, or a second rod may be inserted in the aperture 7 before removing the rod from the aperture 6 to prevent the key-levers from dropping out of position, it being understood, however, that one fulcrum-rod only is required for either electric or non-electric operation of the machine. The vertical arms or levers 18 form a slot-and-pin connection with the arm 17, as at 19. In non-electric operation of the machine the fulcrum-rod passes through both the key-levers 3 and the aperture in the curved lower portion of the vertical arms or levers 18, which then become rigid with the key-levers, the said aperture corresponding to the aperture 7 in the key-levers 3. In Fig. 1 the aperture in the vertical lever 18 corresponds to the aperture 7 of the key-lever 3, though in practice I may arrange it to conform to that at 6 by reversing the curved portion of the lever. The key-lever 3 is provided with an extension beyond the fulcrum-points 6 and 7, on the end of which extension is mounted a spring-controlled sliding block 8, the block being provided with a spring-controlled tongue 9 for lifting the circuit-closing foot 10. It will be understood that in practice the block 8 will be placed a sufficient distance below the foot 10 so that in the non-electric operation of the machine the foot will travel toward the rear of the machine, and by the time the block 8 will have reached the normal point of rest of the foot 10 the foot and block will pass each other, so as not to close the electric circuit through the plate 107, Fig. 1, with which each circuit-closing foot 10 is provided, the said plate 107 being mounted on the angular or wedge-shaped portion of the foot 10, suitably insulated therefrom. The foot 10 is held in normal position by the spring 31, as shown in Figs. 1 and 16, until lifted by the tongue 9 of the block 8. The foot 10 is carried in a slotted cross-head 11 and is vertically movable for contact with the terminal or contact plates 15 and 15$^A$, the cross-head 11 being formed on and is therefore a part of the plunger bar or rod 14, which bar passes through the guide 12 and is supported on balls, as shown by dotted lines in Fig. 1. The guide-bar extends across the machine and is a common guide for a plurality of plunger-bars and their cross-heads. The plunger bar or rod has a vertical arm 14$^A$, which is pivotally connected in a slot in the lower portion or extension of the type-bar lever 16. The several levers 16 of the series are suitably fulcrumed, as indicated in Fig. 1, according to their position in the series, each one from the center being bent more or less in one direction or the other, according to its position, to bring its upper end into proper relation with respect to the corresponding type-bar 22 and to conform to the radius of the semicircle in which such type-bars are fulcrumed. Each type-bar lever 16 is connected to its corresponding type-bar 22 by a link 21, which is twisted upon itself more or less, so that one end of the link may be always in a vertical plane corresponding to the plane of the lever 16, while the plane of the other end may be varied to accommodate itself to the plane of the corresponding type-bar. The arrangement of the type-bar levers 16 not being the subject of claim in this application is not further detailed; but reference may be had to a former application, Serial No. 190,376, filed January 23, 1904.

13, Fig. 1, is an adjustable latch or toothed bar extending transversely or across the machine, one tooth of which is only shown, engaging the circuit-closing foot 10. This latch-bar is mounted on the guide 12, which also extends transversely or across the machine, which is a common guide or support for all the plunger-bars and cross-heads, as previously explained. The latch-bar 13 is for the purpose of preventing the circuit-closing foot 10 from moving out of normal position until lifted from engagement with the tooth, and consequently prevents the type-bars from bounding or vibrating after being operated. I prefer to only use the latch in the electrical operation of the machine.

15 and 15$^A$ are metallic contact-plates having suitable insulation between them, as shown.

15$^B$ is an insulated support for the plates 15 and 15$^A$. The plates 15 and 15$^A$ are in electric circuit with the magnet 30 and the electric source of supply. The magnet 30 draws the armature 26 to the core 27 and with it the hooked channel-plate 25, the circuit-closing foot, (which we will assume has been lifted by the key-lever, as explained hereinafter in the operation of my machine,) the plunger-bar 14, and the lower portion of the lever 16. In this operation it will be seen that the upper portion of the lever 16 moves toward the front of the machine, lifting the type-bar through the link connection to the printing-point. It is to be understood that the plate 25 extends across the machine and is a common operating medium for a plurality of circuit-closers 10.

In Figs. 17 and 18, Fig. 17 is a side elevation and Fig. 18 shows a plan of the magnets arranged in tandem for operating the hooked plate 25 and the escapement mechanism, as will be hereinafter described. In the construction shown in Figs. 17 and 18 the circuit is closed for the printing of a character or operation of the escapement by means of the key-lever or space-bar, as the case may be. The current flowing into the magnet 30 draws the armature 26 toward the core 27 and with it the hooked plate 25. The armature 26$^A$ of the magnet 30$^A$ leaves the core 27$^A$. When the spring-controlled circuit-closer 113, which is mounted on the bar 114 of the yoke 25$^A$, comes in contact with the insulated plates 112$^A$ and 113$^A$, attached to the magnet 30$^A$, the current flows into the magnet 30$^A$ and returns the plate 25, the armature 26, the yoke 25$^A$ and armature 26, the yoke 25$^A$ and armature 26$^A$ to their normal position, as shown. In practice a set of tandem magnets would be mounted on each side of the machine, though I am not confined to two, as I may use any number.

In my invention I may use solenoids instead of magnets. Fig. 22 is a plan, and Fig. 23 an end view, of two solenoids of ordinary construction, 30$^B$ and 30$^C$ being the coils of wire wound in any suitable manner and 27$^B$ the cores which are of the usual construction, attached to which is the hooked plate 25. When the circuit is closed, the current flows into the solenoids, moving the cores in and out of the coils with one contact or closing of the circuit by suitable means.

In Figs. 20 and 21 the electrical connections are shown between the contact-plates 15 and 15$^A$ and the magnet 30, Fig. 20, and solenoid 30$^B$, Fig. 21. In Fig. 20, 131 is an ordinary lamp-socket and attachment-plug connected to a suitable source of electric supply, 132 being an ordinary snap-switch and 133 a resistance-box or rheostat by which the voltage may be regulated for the operation of the machine.

In Fig. 21, 130 is a double-pole knife-switch of the usual construction, 128 being some suitable inductive resistance and 129 a handle for regulating the voltage to be supplied to the solenoid 30$^B$. In this arrangement of parts I am enabled to use the alternating current.

32 is a ratchet-wheel for rotating the platen 33 by means of the handle-bar or lever 36.

34 is the carriage end piece or platen support.

35 is a lever for the adjustment of the paper, which lever forces the feed-rollers from contact with the platen in a suitable manner.

Referring to Figs. 13 and 14, the carriage 34 is laterally movable on the ball-bearing tracks 37 and 38, the tracks being provided with grooves 100, in which the balls 103 travel, and are secured to the frame 1 of the machine by the Z-plates or angle-supports 101, which are secured to the frame 1 by the screw 102. The frame of the carriage is provided with cylindrical sleeves 99, which carry the balls 103 and are provided with end plates 105, Fig. 14, conforming to the grooves in the track 37 to prevent the escape of the balls. 104 represents the edges produced by the curved grooves 100 in the rods or tracks 37 and 38 and vary in thickness and number as the concave grooves 100 are larger or smaller and the number of the grooves.

Fig. 15 shows a modified knife-edge form of track, 37 being the track, 104$^A$ the edges, and 100$^A$ the space between the sleeve 99 and the track for balls should it be desired to use them.

The carriage 34, Figs. 1, 2, and 5, is provided with a rack 69, which meshes in the gear-wheel 48, attached to the shaft 50, which shaft is connected to the motor-spring 40 and furnishes power to the carriage. The motor-spring is of the usual construction and is located centrally of the width of the machine or other convenient position. Meshing with the gear-wheel 48 is a pinion-wheel 49, mounted on a shaft 53, which passes through and is supported by the yoke or bracket 54. On this shaft 53 and in the yoke 54 is mounted an escapement-wheel 52, the teeth of which have the shape of a rhomboid or parallelogram and are placed at right angles to the web or disk, Figs. 9 and 10, and parallel to the axis 53 of the wheel 52, as shown. In Fig. 9 it will be seen that the disk between the teeth 95 is concave or cut out, as at 96, the teeth being secured at the point where the curves terminate. In some cases the teeth 95 may have a rhombic form—that is, its sides may be all equal instead of two unequal sides, as in the drawings. The angles of the upper and lower portion of the teeth vary, but are generally parallel or nearly parallel with each other, according to requirements.

46$^A$, Figs. 1, 2, and 7, is a yoke-block provided with an arm 46, extending over the gear and escapement wheels 48 and 49 and 52, which will be more fully described. The yoke-block 46$^A$ is provided with flanges 85, which are movable in the guides 71, Figs. 1, 2, and 6, and is held in its normal position by the spring 59. The guides 71 are secured to the frame 1 of the machine by the screws 84. Vertically movable in the armed block 46$^A$ is a detent-yoke 73, secured to which is the rigid or detaining dog 57 and the detent or pawl 51. The detent or pawl 51, Fig. 12, has an extension above its fulcrum provided with an angular or beveled face for engagement with an oppositely-disposed beveled or angular faced lug or dog 47, Figs. 7 and 12, and is stationary on the arm 46 for the purpose hereinafter explained. The detent-yoke 73 is provided with a slot 79, Figs. 4 and 7, through which the pins 58 pass for allowing the detent-yoke to freely move vertically.

80, Fig. 4, is a lug which is movable with the yoke 73 in the space 75, Fig. 3, between the projections 76 of the block 74, Figs. 3 and 7, for limiting the vertical movement of the detent-yoke 73, which limitation is adjustable by the set-screw 68, Fig. 7, which raises or lowers the block 74, as required.

83, Fig. 4, is a spindle secured to the detent-yoke 73 and carries the detent or oscillating dog 51.

89, Fig. 7, is the spring for forcing the lower portion of the detent or pawl 51 out of a vertical position when released from engagement with the tooth 95 of the escapement-wheel 52.

81, Fig. 4, is an aperture for pivotally connecting the rod 60, which through the levers 16 and the universal bar 65$^A$ motion is communicated to the detent-yoke 73, Figs. 1 and 7.

The arm 46, Figs. 2 and 7, extending from the yoke-block 46$^A$, above referred to, is provided with a spring-controlled plunger-rod 55$^A$, loosely mounted in the arm 46, the said arm being provided with a slot, as at 87, for a compression-spring 88. The plunger-rod is provided at its end with a suitable receptacle 55 for loosely mounting and partly inclosing a ball 45, the receptacle being concave on the sides and of less thickness than the ball 45, as shown in Fig. 19, which is a section of the receptacle 55 of the plunger rod or bar 55$^A$, taken on the line 1 2 in Fig. 7, the view being toward the front of the machine or in the direction of the arrow at the extreme left of Fig. 7.

39 is a shoulder or lug on the plunger-rod 55$^A$ for the purpose to be hereinafter explained.

The ball 45 travels in the V-shaped grooved or slotted track 44, Figs. 2, 7, and 19, which is movably attached to the carriage and extends the full length thereof.

42 and 77, Figs. 2 and 5, are rods pivotally connected to the links 70, fulcrumed on the rack 69. The rods 77, Fig. 1, pass through the guides 43 and are secured to the track 44, the knob 41 providing means for actuating the track and plunger-rod 55$^A$, as will be hereinafter described in the operation of my invention. The plunger-rod 55$^A$ is provided at one end with a foot 56, Figs. 1 and 7, for engagement with the upper portion of the detent or pawl 51, which when moved by the track 44 passes behind the upper portion of the detent and prevents it from being thrown out of a vertical position by the spring 89 when disengaged from the tooth 95 of the escapement-wheel 52 and when the yoke-block 46$^A$ is moved toward the rear, as will be more fully explained.

46$^C$ is a cover extending over the escapement mechanism, and is secured to the frame 1 in any suitable manner, and is for protecting the escapement mechanism from dirt and dust.

65$^A$, Fig. 8, is a bar extending across the machine, commonly known in type-writer construction as the "universal" bar, against which the levers 16 come in contact in the operation of the machine.

63, Fig. 8, is a rod passing through the supports 64, which are secured to the frame 1 of the machine.

94 represents collars rigidly secured to the rod 63 for preventing any lateral movement of the rod 63.

61 is an arm, Figs. 7 and 8, rigidly secured to the rod 63 and extends horizontally toward the front of the machine, to which is pivotally connected the rod 60, and to the rod 60 the detent-yoke 73 is also pivotally connected, as shown in Fig. 7.

93, Figs. 7 and 8, is a collar adjustably mounted on the rod 63, to which is rigidly secured the spring 91, one end of which being made fast to the arm or crank 61. On each end of the rod 63 is rigidly secured a downward-extending arm 62, as shown in Fig. 7. To these arms is pivotally connected the rods 65, which are rigidly secured to the universal bar 65$^A$. The screw 66, Fig. 7, passes through the collar 93 and secures it to the rod 63. When desired to increase or decrease the spring tension on the parts just described, the screw 66 is loosened, the collar turned in the desired direction, and the screw again set up, which fastens the collar 93 and the rod 63 together.

I will now describe my automatic step-by-step spacing mechanism.

In Fig. 16 the parts are similar to those hereinbefore described, with some exceptions, which will be further explained. It will be seen that in this view the upper end of the lever 16 does not form a connection with any other parts and that the circuit-closing foot or member 10 is provided with a notch 67 in its upper portion for a purpose to be explained in the operation of the device. The key-lever 3, Fig. 16, has a foot or block at one end, as shown at 108. The foot or block 108 is sloping on its upper face, so that when elevated by depressing the key 2 the foot or block will assume a horizontal position. The plate 25 at a point just over the notch in the foot 10 is provided with a hook or lug 110 for engagement with the notch 67 of the foot 10 when it is lifted for operation.

I will now explain my invention when the machine is set for electrical operation where a step-by-step movement is communicated to the carriage. The key-lever 3, Fig. 1, in this case is fulcrumed at 6. Upon depressing the key 2 the block 8 is lifted, and with it the tongue 9, which engages the wedge-shaped circuit-closing foot 10 and lifts the foot from engagement with the latch 13. The plate 107 on the wedge-shaped circuit-closing foot 10 makes a contact with the plates 15 and 15ᴬ, which are in electrical connection with the magnet 30, thus closing the circuit and causing the magnet to draw the armature 26, the channel-plate 25, the foot 10, by means of the hook 109, the plunger-bar 14, and its hook 14ᴬ toward the core 27. The circuit is immediately broken by the foot 10 being drawn away from the contact-plates 15 and 15ᴬ by the channel-plate 25, the motion being thereby communicated to the lever 16, the link 21, and the type-bar 22. As the lever 16 moves toward the front of the machine it carries with it the universal bar 65ᴬ, drawing the rod 65, thus communicating motion to the arm 62, and lifts the rod 60, which is pivotally connected to the detent-yoke 73, which is also lifted, and with it the rigid or holding dog 57, Fig. 4, whereupon it engages a tooth and arrests the rotation of the escapement-wheel 52. The detent-yoke 73 is provided with a projection 80, which engages with the lug 76 on the block 74 and limits the stroke of the detent-yoke 73. The rigid or holding dog 57, by reason of the angular portion of the tooth 95, forces the escapement-wheel 52 against the action of the carriage motor-spring 40 and removes the pressure from the face of the detent or pawl 51, which lifts over the upper portion of the tooth 95, and simultaneously with clearing the top of the tooth 95 the beveled portion of the detent engages with the oppositely-disposed beveled portion of the stationary lug or dog 47, Figs. 11 and 12, on the arm 46, and forces the lower portion of the detent forward ready for engagement with the next tooth of the escapement-wheel 52. Therefore it will be seen that the detent 51 is not wholly dependent on the spring 49 for its action, but will readily adjust itself to the speed at which the machine is being operated without "piling" letters. The universal bar 65ᴬ is returned to its normal position by the action of the spring 91, which forces the arm 62, Fig. 7, to its normal position, and with it the detent-yoke 73 through its connections.

By using an escapement-wheel with teeth in the form of a rhomboid or parallelogram above and below the web or disk and parallel to the axis I am enabled to secure a very positive coaction with the detent or rocking dog 51, as above explained. The escapement-wheel 52 is secured to a shaft 53, which passes through and is mounted upon the bracket or yoke 54, Fig. 1, the upper portion of the shaft 53 being provided with a pinion-wheel 49, motion to which is communicated by the gear-wheel 48, connected to the shaft 50, which in turn is connected to the motor-spring 40 and furnishing tension to the carriage by means of the rack 69, which meshes with the gear-wheel 48, and through the operation of the escapement mechanism just explained a step-by-step movement is communicated to the carriage.

It being essential in operating type-writing machines to be able to release the carriage from the escapement mechanism at any point on the writing-line, I accomplish this result in my invention in the following manner: When the knob 41, Fig. 1, is pushed inward, the V-shaped track 44, Fig. 7, is actuated by means of the links 70, hereinbefore described and shown in Figs. 1, 2, and 5, this track 44 extending the full length of the carriage. The track is maintained in engagement with the ball 45 by means of the spring 88 in the plunger-rod 55ᴬ. The operation of the knob 41, already referred to, compresses the spring 88, forcing the plunger-rod 55ᴬ to the position shown in dotted lines in Figs. 7, the foot 56 passing behind the upper portion of the detent 51, arresting the action of the spring 89 and detent 51. At this stage of the operation the shoulder 39 engages the arm 46 at 46ᴮ and forces the yoke-block 46ᴬ to move toward the rear of the machine in the guides 71, Fig. 6, which withdraws the rigid dog 57 and the detent 51 from engagement with the tooth 95 of the escapement-wheel 52, thus freeing the escapement-wheel 52 and permitting the carriage to freely travel in either direction so long as the knob 41 is under compression, the ball 45 meanwhile traveling in the V-shape grooved rack or track 44. When the knob is released, the yoke-block 46ᴬ returns to its normal position by the action of the spring 59, the spring 88 forcing the plunger-rod 55ᴬ, the foot 56, and the rack 44 to their normal positions, also the rigid dog 57 and the detent 51, or in engagement with the escapement-wheel 52.

When the machine is non-electrically operated, the lever 18, Fig. 1, is rigidly secured to the key-lever 3 by means of a rod or pin inserted in the fulcrum-aperture 7. When the key-lever 3 is depressed, the lever 18 oscillates or rocks and the motion is transmitted to the lever 16 and thence to the escapement mechanism through the levers 60 and rod 65, as has been described.

When it is desired to secure a continuous step-by-step movement of the carriage through the escapement mechanism in my invention, a depression of the key 2 of the key-lever 3 raises the foot or block 108, Fig. 16, the face of which is sloping when the foot is in normal position, to a horizontal position, and with it the circuit-closing foot 10. The notched upper portion 67 engages the hook 110 on the plate 25. The circuit now being closed by the plate 107 on the wedge-shaped portion of the foot 10 by contact with the contact-plates 15 and 15ᴬ, the current flows into the magnet 30, draws the armature 26 and the hooked plate 25 toward the core 27 and also carries with it the plunger-bar and crosshead 11 and the foot 10. Motion is now communicated, through the plunger-bar and cross-head, to the lever 16, the universal bar 65ᴬ, the rod 65, also the rocker-arms 61 and 62 and rod 60, which lifts the detent or yoke 73 and operates the escapement mechanism, as has been previously explained. The foot or block 108 being of greater length than the stroke of the plunger-bar and cross-head 11 prevents the foot 10 from dropping off, and the hooked plate 25 being engaged with the notch 67 in the upper portion of the foot 10 causes the foot to alternately make and break the circuit with the plates 15 and 15ᴬ, thereby actuating the plate 25, foot 10, and escapement mechanism through the connecting-arms and levers, which vibratory action continues as long as the key 2 is depressed or until the carriage has reached the end of the writing-line, when the operator is notified by a bell or other means that the key 2 should be released.

I am not confined to the precise construction herein set forth and described; but I may modify such parts of my invention as may be deemed expedient without departing from the subject-matter herein shown and claimed.

Having described my invention, what I claim, and desire to secure by Letters Patent, is—

1. In a type-writing machine, the combination with an escapement mechanism comprising a carriage, a rack attached thereto, a gear-wheel meshing in the said rack, a pinion communicating with the said gear-wheel, a toothed escapement-wheel connected to axle of the said pinion, the said escapement-wheel provided with teeth having the form of a rhomboid, or parallelogram, the said teeth being at right angles to the disk or web of the escapement-wheel and parallel to its axis, and extending above and below the surface of the web, means for imparting a rotary motion to the said train of gears and the escapement-wheel, and a bevel-face spring-controlled rockable detent for normally engaging and disengaging therewith, as described.

2. In an electric type-writing machine, the combination with a series of type-bar-operating keys, a carriage, a rack attached to the said carriage, a gear-wheel normally connected to the said rack, means for imparting a rotary motion to the said gear-wheel, a rhomboidal-toothed escapement-wheel, an overhanging arm extending over the said gear-wheel and the escapement-wheel, a slotted horizontally-movable spring-controlled support or block for the said arm, a slotted vertically-movable plate or yoke in the said support or block, a rhomboidal or double-beveled oscillating spring-pressed detent on the upper portion of the said movable slotted plate or yoke, a vertically-movable pawl or dog on the lower end of the said slotted plate or yoke, a fixed wedge-shaped stop or dog on the said overhanging arm, means for raising the said slotted plate or yoke to alternately bring the said rhomboidal-toothed escapement-wheel in contact with the said fixed dog and the pawl and allowing it to space off one tooth at a time. as described.

3. In a convertible electric type-writing machine, an escapement mechanism comprising an escapement-wheel having parallelogram-shaped teeth at right angles to the web and parallel to the axis thereof, and gears for imparting motion to the said escapement-wheel, a rockable spring-pressed angle-face detent for engaging and disengaging a tooth of the said escapement-wheel, a fixed lug or dog above the said detent, a movable pawl or dog beneath the detent and normally disengaged therefrom for holding a tooth of the escapement-wheel during an oscillation of the detent, and a horizontally-movable normally disengaged foot for arresting the action of the said detent and a sliding spring-controlled arm or yoke for disconnecting the said pawl and detent from engagement with the escapement, as described.

4. In a type-writing machine, an escapement mechanism comprising a train of communicating gears, a rhomboidal toothed escapement-wheel, a double-beveled rhomboidal-shaped rockable detent, a slotted ball-bearing rod and foot for arresting the said detent and releasing it from contact with the said rhomboidal-toothed wheel, a slotted movable yoke carrying the said detent at its upper end, a pawl or dog on the lower end thereof for engagement with the teeth of the said escapement-wheel, a fixed dog or lug above the said detent and normally disengaged therefrom, means for raising and lowering the said slotted plate or yoke for engaging and disengaging the said detent and pawl with the rhomboidal teeth of the escapement-wheel, and the fixed dog or lug, a grooved rod extending across the machine for engagement with the ball-bearing rod, and means for communicating pressure to the said grooved rod, and the ball-bearing rod and the foot, as described.

5. In a convertible electric type-writing machine, an escapement mechanism comprising, a rhomboidal-toothed escapement-wheel, means for rotating the said wheel, a rockable spring-pressed angular face-detent for engagement with the said wheel, a vertically-movable slotted yoke or plate carrying the said detent or pawl normally disengaged from the said wheel, and adapted to be moved under the teeth thereof, a lug on the said yoke or plate, a notched adjustable screw-operated block for engagement with the said lug on the plate or yoke, a fixed lug or dog above the said detent, a sliding yoke-block provided with an arm overhanging the said escapement-wheel and inclosing the said slotted plate or yoke, means for raising and lowering the said slotted plate to engage the said fixed lug or dog and pawl into contact with the detent and escapement-wheel, a ball-bearing slotted spring-controlled movable rod in the said overhanging arm, a pendent foot on the said rod and adapted to arrest the motion of the said detent, means for horizontally moving the said foot and overhanging arm, a ball adapted to travel in a normally stationary groove, a concave receptacle of less thickness than the ball in one end of the said slotted rod, a V-shaped track or rod for supporting the said ball and rod in its travel, means for horizontally moving the said ball, the ball-bearing rod, the pendent foot, and the overhanging arm, and the ball and tracks for guiding the said overhanging arm during the horizontal movement thereof, as described.

6. In a convertible electric type-writing machine, the combination with a carriage, a key-controlled escapement mechanism, a train of operating-gears, an escapement-wheel having angle or rhomboidal teeth, a rockable spring-controlled detent for alternately engaging said teeth, a movable pawl for arresting the teeth of the said escapement-wheel when raised, a fixed lug or dog for engagement with the detent and the rhombic teeth, a movable ball-bearing spring-controlled rod, a V-shaped grooved rod or track for the end of the said ball-bearing rod, means for moving the said rod and its support, and a hooked foot for arresting the said detent, and its oscillations, a sliding block having a projection or arm thereon, the said arm overhanging the said gear and escapement-wheel, means for movably supporting the said detent and movable pawl in the said block when in engagement with the said escapement-wheel, and means for sliding the block and disengaging the said detent and the movable pawl from engagement with the escapement-wheel and the fixed lug or dog, as described.

7. In an electric type-writing machine, the combination of a series of key-levers, a rack and carriage, a rhomboidal-toothed escapement-wheel, the said wheel adapted to be engaged and disengaged during a certain period of its revolution, an oscillating vertically-movable detent for stepping off one tooth at a time, a movable pawl below and a fixed lug or dog above the said detent and escapement-wheel to defer the action of the said detent until the said wheel has made a definite fraction of its revolution, a pendent foot or dog for arresting the said detent and freeing the said rhomboidal wheel therefrom, a vertically-movable adjustable plate or detent-yoke carrying the said detent and pawl, a plurality of pins for vertically supporting the said plate in its support, a movable overhanging arm carrying the said foot or dog, the said arm being movable and adapted to disengage the said pawl and detent from the rhomboidal-toothed wheel, a semicircular bar across the said series of type-bar levers, and across the machine for operating the escapement mechanism when the key-levers are depressed or the type-bar levers are moved out of their normal position, as described.

8. In a type-writing machine, and an escapement mechanism, the combination with a carriage and an escapement-wheel therefor having rhomboidal or double-beveled teeth, a pivoted rockable detent or dog, the said detent being vertically movable, a fixed lug for engagement with the said detent when elevated, a vertically-movable pawl for engaging the teeth of the said rhomboidal toothed escapement-wheel, a sliding spring-controlled overhanging arm or yoke adapted to be moved in engagement to disengage the said detent and pawl from contact with the said escapement-wheel and fixed lug on the said arm, a pendent foot or dog for arresting the said detent and maintaining it in a vertical position, means for elevating and depressing the said detent and pawl, a concave ball-bearing slotted spring-pressed arm adapted to move said pendent foot or dog and the overhanging arm, as described.

9. In a type-writing machine, the combination with a carriage, a rack, an escapement mechanism comprising a rhomboidal or double-bevel toothed escapement-wheel, an overhanging movable arm or yoke over the said wheel, a rockable spring-controlled detent, means for engaging and disengaging the said detent from the wheel, a hooked pawl or dog for engaging the lower part of the rhomboidal teeth, means for alternately engaging and disengaging the said detent and pawl with the said escapement-wheel for producing a non-synchronous or intermittent motion for moving the carriage step by step, a foot or dog for simultaneously arresting the said detent and disengaging the said detent and pawl from the escapement-wheel by moving the said overhanging arm or yoke, and a fixed angular lug or dog on the said movable arm for engagement with the said detent when elevated, as described.

10. In a convertible electric type-writing machine, the combination with a key-lever-controlled carriage, an escapement mechanism, an automatic key-lever-operated spacing mechanism comprising an insulated wedge-shaped contact-plate extending across the machine, a notched wedge-shaped circuit-closing foot, a double-hooked plate adapted to engage in the notch of the said foot, a key-lever carrying an inclined shoe on one of its ends, an electromagnet or solenoid in electric circuit with the said contact-plate, means for electrically connecting the said magnet and the contact-plate with a source of current, means for causing the said circuit-closing foot to make an electrical connection with the said contact-plate by the key-lever for operating the escapement mechanism, and means for securing the said hooked plate to the magnets for engaging in the said notch in the circuit-closing foot, as described.

11. In a convertible electric type-writing machine, the combination with a key-lever-operated carriage, a series of escapement elements, an automatic spacing or skipping mechanism comprising a contact-plate, a notched circuit-closing foot, a plunger-bar carrying a slot for the said foot and adapted to allow the said foot to move vertically, means for connecting the said plunger-bar with the escapement mechanism, an electromagnet or solenoid, an electric connection with the said contact-plate and the source of current, a hooked plate connected to the said magnet or solenoid on one end, the said hooked portion of the said plate adapted to be engaged in the said notch of the circuit-closing foot, an angular shoe on one end of the key-lever, means for causing the said angular shoe to lift the said circuit-closing foot and make an electric connection upon the said contact-plate, and means for obtaining a vibratory motion of the hooked plate, circuit-closing foot or member and operating arms and levers when the key-lever is depressed, as described.

12. In a convertible electric type-writing machine, the combination of an escapement mechanism, a series of operating key-levers, a carriage and an automatic electric spacing mechanism comprising a contact-plate, a notched circuit-closing foot, means for connecting the said foot to the escapement-operating levers, a key having a sloping block or foot on one of its ends, means for causing a contact between the circuit-closing foot and the contact-plate when the key-lever is depressed, and electromagnets placed in tandem or one behind the other, and armatures for the said magnets, a series of rods forming a rectangular inclosure or yoke and connecting the armatures of the said magnets, a middle plate between the said magnets, a spring-cushioned circuit-closing plate between the said middle plate, an insulated contact-plate on one of the said magnets, a double-notched channel-bar on the said rectangular inclosure or yoke, and means for causing the said magnets to attract and repel the said armatures by means of the said contact and circuit-closing plates, and means for connecting the said contact-plate with the magnets and the electric source, substantially as described.

13. In a convertible electric type-writing machine, the combination of a gear-and-pinion-controlled escapement mechanism, a series of operating key-levers, a carriage and automatic spacing mechanism comprising a series of insulated transversely-disposed contact or terminal plates connected to the electric source, a notched wedge-shaped circuit-closing member, lever means for actuating the said circuit-closing member, a key-lever having a sloping block or angle-foot when out of action and adapted to assume a horizontal position when raised or elevated, means for forming a contact between the said insulated terminal plates and the wedge-shaped circuit-closing foot or member by the said sloping foot when the key-lever is depressed, a hooked transversely-disposed plate and electrically-connected coil wound tandem and yoke-mounted core-operating means for actuating the said circuit-closing member, and means for automatically opening and closing an electric circuit, substantially as described.

14. In a gear-and-pinion-controlled escapement mechanism for type-writing machines, the combination with a carriage, a carriage-operating rack, a rhomboidal or double-bevel toothed escapement-wheel, the said wheel adapted to normally rotate step by step, a rockable or oscillating spring-controlled detent adapted to engage and disengage a tooth of the said escapement-wheel, a holding pawl or dog for engaging an opposite point on the tooth of the escapement-wheel, means for alternately engaging the said detent and the holding-pawl with the rhomboidal teeth of the said wheel for imparting motion to and retarding the rotation thereof and moving the carriage step by step, a movable block having an arm overhanging the said escapement, and movably supporting the said holding-pawl and the rockable detent, a fixed lug on the said arm adapted to engage the detent when elevated, a hooked spring-controlled slotted ball-carrying rod, the said rod having an angular end or foot adapted to arrest the action of the detent when disengaged from the escapement-wheel, a movable yoke in the said sliding block for supporting the said detent and holding-pawl, means for vertically moving the said yoke-detent and holding-pawl in and out of contact with the rhomboidal-toothed escapement-wheel by means of the key-operating levers, a movable grooved or angular track coacting with a ball-carrying slotted rod and detent-yoke-supporting movable block, and means for disengaging the holding-pawl and detent from contact with the escapement-wheel, substantially as described.

15. In a gear-connecting rotative step-by-step-operated escapement mechanism for type-writing machines, the combination comprising a movable carriage, a rack attached thereto, a gear-mounted vertical motor-spring-controlled rotative shaft, an escapement-controlled pinion meshing in said gear and constituting a train of gears, a bevel-faced lug and spring-controlled bevel-faced detent-pawl and detaining-dog engaging and disengaging alternately a tooth of the escapement-wheel, means for communicating motion to the said detent and dog, a movable detent-supporting armed block, a bevel-faced rigidly-secured, downwardly-disposed lug on the arm of the said block, a movable detent-carrying yoke in the said block, means for communicating motion to the said armed block, a shouldered angle-footed spring and rack controlled ball-carrying plunger-rod movably supported in the arm of the movable block, a lever and link controlled grooved ball-carrying rack or track, means for moving the said rack, a spring and universal-bar controlled armed and collared transversely-disposed rod, means for operating the universal bar and armed and collared rod, a transversely-disposed universal plunger-bar guide or support, insulated guide-mounted transversely-disposed terminal contact-plates in electrical circuit with a magnet or solenoid, a plunger-bar-mounted spring and key-lever controlled circuit-closing member, a slotted-head hooked plunger-bar, a plunger-bar and universal-bar controlled vertical lever fulcrumed between its upper and lower ends in a support, a hooked transversely-disposed channel-plate, a block or foot mounted circuit-closer lifting key-lever, and magnetic and key-lever means for actuating the escapement mechanism, substantially as described.

In testimony whereof I have hereunto affixed my signature in the presence of two subscribing witnesses.

GEORGE M. KITZMILLER.

Witnesses:
 WM. FLETCHER,
 WM. E. CLAPP.